United States Patent Office 3,410,176
Patented Nov. 12, 1968

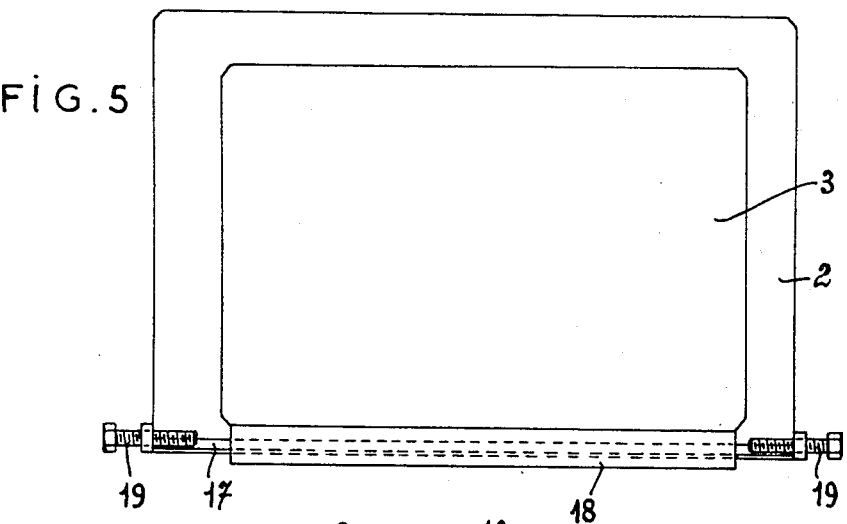
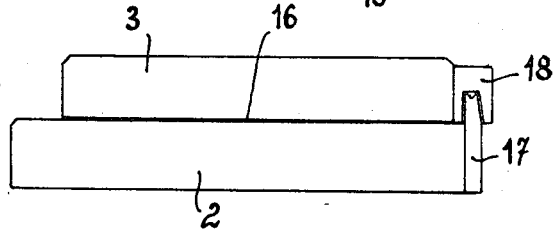

3,410,176
MOVABLE BENCH FOR MACHINE TOOL
Jean Auguste Christophe Van Straaten, 12 Quai de Serbie, Lyon, France
Filed Jan. 19, 1966, Ser. No. 521,665
Claims priority, application France, Feb. 2, 1965, 45,575
1 Claim. (Cl. 90—58)

ABSTRACT OF THE DISCLOSURE

A movable bench for a machine tool in which an upper table supporting a workpiece is magnetically held in fixed position against a lower table until compressed air is fed, through nozzles in one of the tables, against the other of the tables to overcome the magnetic affect and allow the upper table to be displaced.

---

My invention has for its object to provide a movable bench for a machine tool, chiefly for drilling and milling machines and generally speaking for all machines wherein the part to be machined has to be brought into a predetermined accurate position with reference to the tool.

My invention covers to this end the application which is novel for this purpose of the thrust exerting properties of compressed air and of the attractive properties of permanent magnets.

In accordance with the invention there is provided a movable bench including two superposed plates of which one is stationary and is provided in its upper surface with nozzles adapted to provide passageways for compressed air, while the other upper plate is movable and carries on its lower surface permanent magnets which hold fast the movable plate with reference to the stationary plate in a permanent manner, except during the periods during which the compressed air is fed into the above-mentioned nozzles, so as to then urge vertically and upwardly the movable plate by forming a cushion over which the movable plate can slide.

The nozzles, forming passageways for the compressed air, may be executed in various manners. According to a first embodiment of my invention, each nozzle is constituted by a tubular member fitted in a corresponding bore formed in the stationary plate, said tubular member being closed at its upper and at its lower end, while a part of its upper section is provided with a peripheral area of a lesser diameter defining with the upper surface of the lower plate and with the wall of the bore in the said plate an annular slot or chamber communicating through a plurality of lateral ports with the chamber formed inside the tubular member, which last-mentioned chamber communicates in its turn with the channel admitting compressed air through an opening formed in the cover closing the lower end of said tubular member.

Various means may obviously be provided for guiding the movable plate over the stationary plate during the blowing procedure. The stationary plate and the movable plate may be provided for instance along cooperating edges with slideway constituted by interengaging ribs and grooves formed on corresponding plates, while the ends of said slideways carry abutment screws so as to limit the travel of the movable plate over the stationary plate.

My invention will be readily understood from the following description disclosing the advantages and further features of said invention, reference being made to the accompanying diagrammatic drawings illustrating, by way of example and by no means in a limiting sense, an embodiment of said movable bench. In said drawings:

FIGS. 5 and 6 are respectively a plan view from above and an elevationad view of a movable bench of which the stationary plate and the movable plate are provided with means guiding the latter along a predetermined direction.

Figure 1:
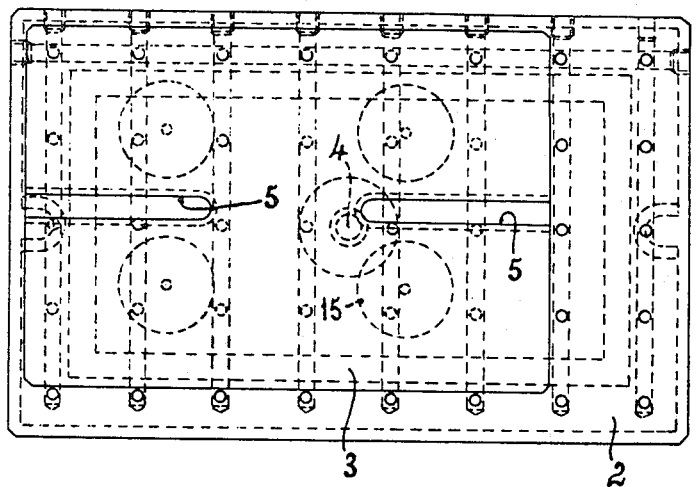
FIGS. 1 and 2 are respectively a view from above and a vertical sectional view through line 2—2 of FIG. 1.
Figure 2:
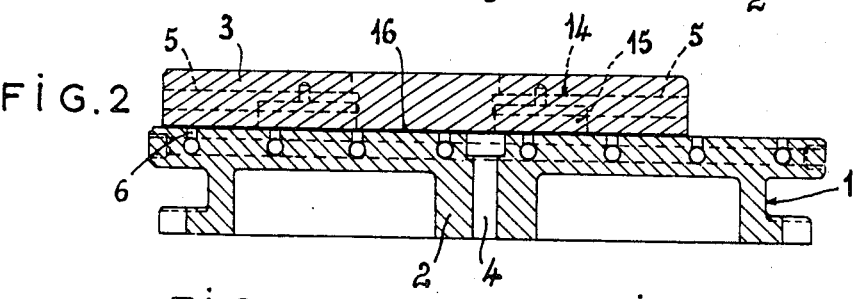

My improved movable bench includes chiefly a stationary plate 2 and a movable plate 3. The stationary plate 2 is designed so as to be secured to the frame or the bench of a machine tool. To this end, it is provided with peripheral grooves 1 and with a central vertical bore 4. The movable plate 3, on the other hand, is designed so as to allow securing the part to be machined on it and it is provided to this end with grooves 5.

Figure 4:
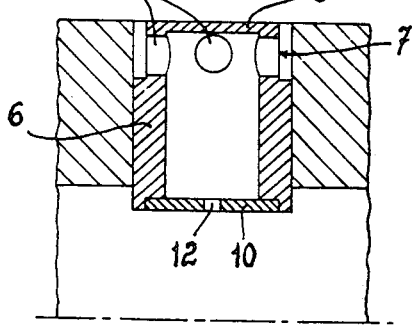
FIGS. 3 and 4 are detail views showing, on a larger scale, a jet or nozzle forming a passageway for the compressed air, said figures being respectively a view from above and a vertical sectional view through line 4—4 of FIG. 3.
Figure 3:
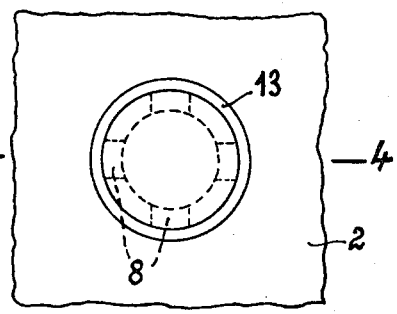

According to my invention, jets or nozzles adapted to provide passageways for the compressed air are formed so as to open in the upper surface of the stationary plate 2, their number and distribution being selected as desired. Each jet is constituted, as illustrated in FIGS. 3 and 4 by a tubular member 6 of which the upper section 7 has a reduced outer diameter and is provided with four ports 8. Said tubular member 6 is closed by an upper cover 9 and at its lower end by a disc in which is provided a gauged central opening 12.

Through said opening 12, the chmaber formed inside the member 6 communicates with channels formed in the plate 2, and into which compressed air is to be admitted. The introduction of such air into the plate 2 is controlled by a pedal or the like control member (not shown) so as to be fed into the jets only when required; when the compressed air is actually fed into said jets or nozzles, said air enters the atmosphere above the plate 2 under a comparatively low pressure, so as to pass in succession through the ports 8 and the annular slot 13, surrounding each nozzle.

The movable plate 3 is provided in its lower surface with circular recesses 14 inside each of which is secured a permanent manget 15. The lower surfaces of said magnets 15 are flush with the lower surface of the plate 3 and the whole lower surface of the plate 3 including such magnets may be protected by a covering sheet 16 having for instance a rubber base.

It is readily apparent that the magnets 15 hold the movable plate 3 fast over the stationary plate 2, which allows machining the workpiece secured to the plate 3. When desired, it is an easy matter to shift the plate 3 over the plate 2, so as to give the workpiece any desired position with reference to the tool. To this end, it is sufficient to depress the pedal controlling the admission of compressed air. Said air is immediately admitted into the chambers of the jets 6 and is released through the annular slots 13 so as to free the movable plate 3 against the action of its magnets. Any lateral movement of the plate 3 may then be executed very easily over the cushion of air extending between the two plates 2 and 3.

In certain cases, it may be of advantage to provide means for guiding the movable plate 3 over the stationary plate 2 during the movements of the workpiece. Thus, the stationary plate 2 and movable plate 3 may be provided, as illustrated in FIGS. 5 and 6, with two slideways 17 and 18 extending along the edges of the plates for cooperation with each other. Adjustable screws 19 may furthermore be provided at the ends of the rib 17 of the stationary plate 2 forming a slideway with the groove 18 formed in the movable member. These screws 19 limit the travel of the movable plate 3 at both ends.

Obviously, my invention is not limited to the sole embodiment disclosed hereinabove by way of example and it covers, in contradistinction, all the modifications thereof, falling within the scope of the accompanying claim; in particular, the movable plate may be secured in a stationary position by means of a reduction in pressure, while means may be provided for braking the movements of the movable plate over the stationary plate; for instance, I may use small projections housed in the lower surface of the movable plate, extending slightly underneath the latter and made for instance of tetrafluorethylene or the like material serving usually in the execution of brake linings.

What I claim is:

1. A bench for a machine tool comprising a lower stationary plate including nozzles opening into the upper surface of said plate at various points thereof, an upper plate adapted to be shifted over the lower plate, releasable means adapted to secure the upper plate in contact in any desired position with the lower plate and means adapted to feed compressed air through the nozzels against the lower surface of the upper plate to overcome the action of the releasable means and to allow a shifting of said movable plate over the lower stationary plate, and wherein the stationary plate is provided with a plurality of vertical bores, and each nozzle includes a tubular member fitted in each bore and the upper section of which is of a reduced diameter and is provided with radial ports opening into the upper end of the bore, a solid cover closing the upper end of the tubular member and a perforated lower cover closing the lower end of said tubular member, the means feeding compressed air opening into the perforation in the lower cover of each nozzle to feed compressed air through the inside of the tubular chamber, the ports in the latter and the upper end of the corresponding bore towards the lower surface of the upper plate.

References Cited

UNITED STATES PATENTS 3,272,568    9/1966    Koorneef et al. _____ 308—5

FOREIGN PATENTS 778,801    7/1957    Great Britain.

LEONIDAS VLACHOS, *Primary Examiner.*